United States Patent [19]

Johnson

[11] 4,344,229

[45] Aug. 17, 1982

[54] FLEXIBLE TREE SAW

[76] Inventor: Robert M. Johnson, 11 Jana Dr., Weston, Conn. 06883

[21] Appl. No.: 119,167

[22] Filed: Feb. 6, 1980

[51] Int. Cl.³ .................. B27B 21/00; B27B 33/14
[52] U.S. Cl. .................. 30/166 R; 145/31 R; 83/830; 83/832
[58] Field of Search ............ 30/166 R; 145/31 R; 83/830, 832

[56] References Cited

U.S. PATENT DOCUMENTS

| | | | |
|---|---|---|---|
| 1,229,597 | 6/1917 | Farrer | 83/830 |
| 3,133,395 | 5/1964 | Farmer | 83/832 X |
| 3,344,821 | 10/1967 | Paganini | 83/832 |
| 3,747,652 | 7/1973 | Meadows | 145/31 R |
| 3,999,294 | 12/1976 | Shoben | 30/166 R |
| 4,218,820 | 8/1980 | Cleva | 30/166 R |

*Primary Examiner*—Donald R. Schran
*Attorney, Agent, or Firm*—Kramer & Brufsky

[57] ABSTRACT

This invention pertains to apparatus for trimming branches of trees and particularly branches high above the ground, without a pole saw, climbing the tree or using a ladder. The apparatus include spaced cutting links with sharp teeth at one end fastened upon a flexible chain. Each end of the chain is connected to a length of rope. A metal weight, sand bag, etc. attached to one of the ropes carries the flexible chain into position over the branch desired to be cut. A counter weight is also provided on one end of the flexible chain to automatically position the cutting side of the spaced cutting links in a downward facing, cutting position as the chain is pulled up onto and over the branch.

7 Claims, 7 Drawing Figures

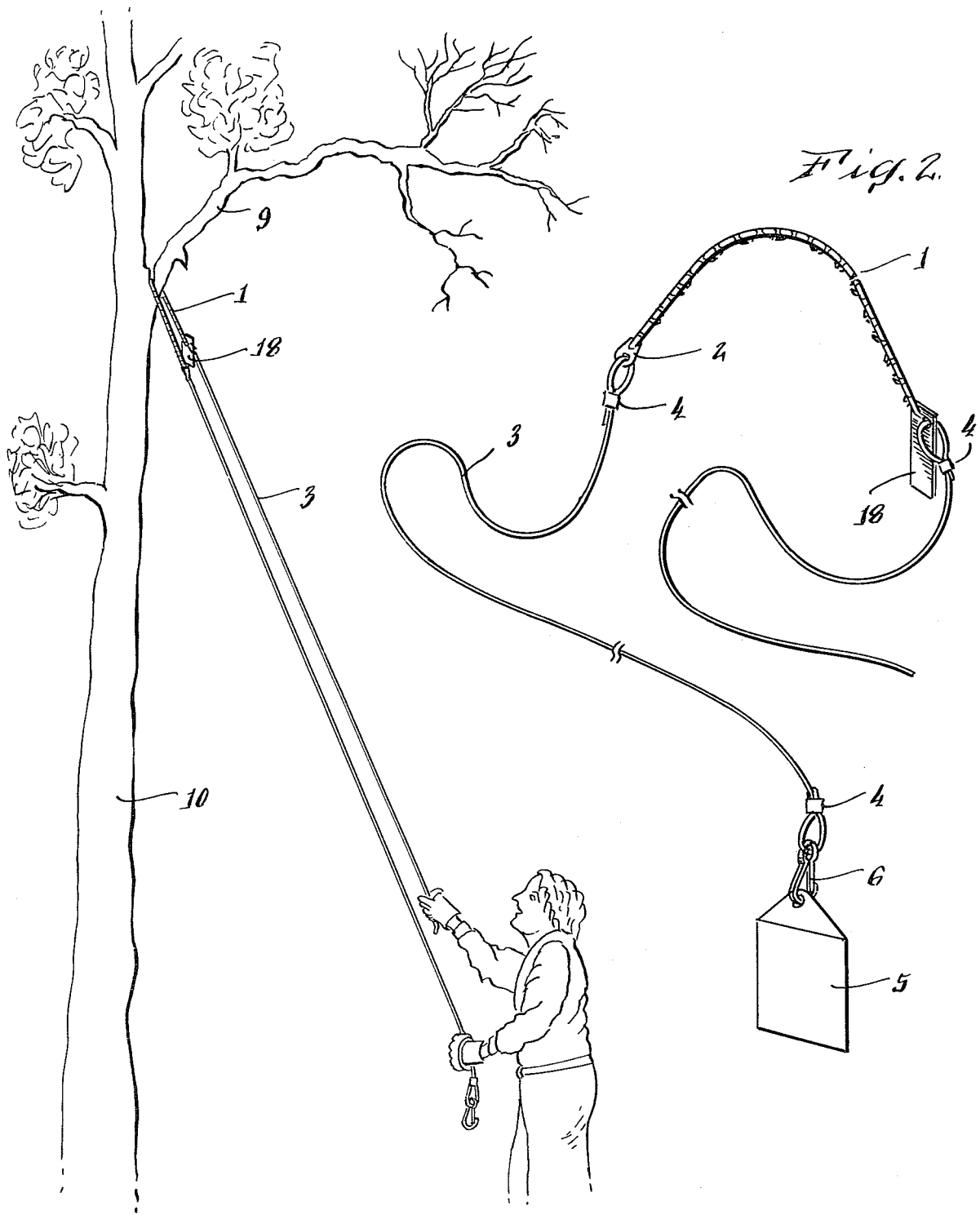

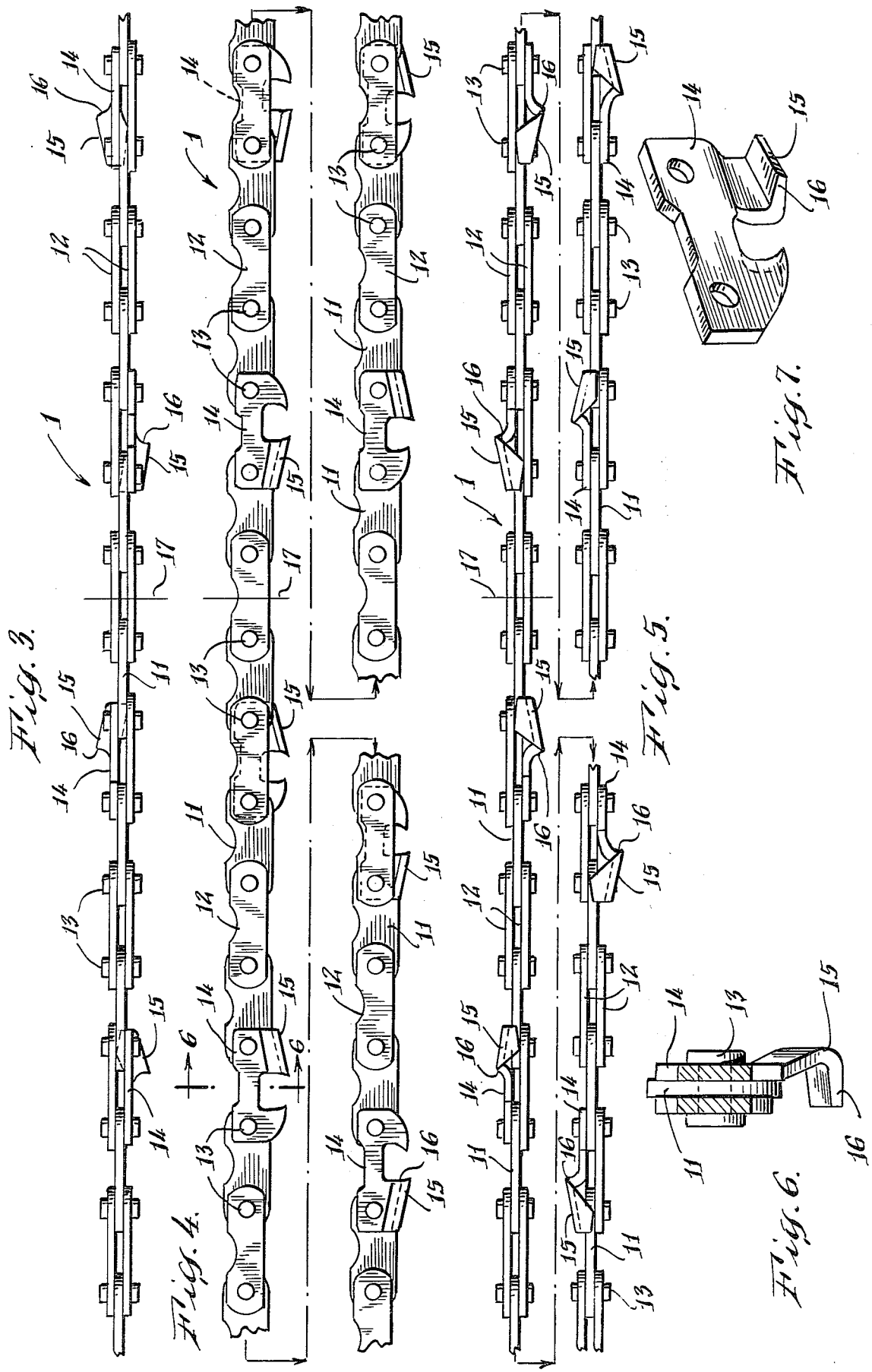

FLEXIBLE TREE SAW

This application is related to application of U.S. Ser. No. 947,017, filed Sept. 29, 1978 now U.S. Pat. No. 4,193,188 and U.S. Ser. No. 85,549, filed Oct. 19, 1979 now U.S. Pat. 4,240,203.

This invention pertains to means for trimming branches of trees and particularly branches high above the ground, without a pole saw, climbing the tree or using a ladder. The means include spaced cutting links with sharp teeth at one end fastened upon a flexible chain. Each end of the chain is connected to a length of rope. A metal weight, sand bag, etc. attached to one of the ropes carries the flexible chain into position over the branch desired to be cut. A counter weight is also provided on one end of the flexible chain to automatically position the cutting side of the spaced cutting links in a downward facing, cutting position as the chain is pulled up onto and over the branch.

Referring to the drawing broadly:

FIG. 1 illustrates my flexible tree saw or cutting assembly in operation on a tree;

FIG. 2 is a detail view of the complete sawing mechanism together with the throwing and positioning weight;

FIG. 3 is a top plan view of the flexible chain portion of the cutting assembly of FIGS. 1 and 2;

FIG. 4 is a side view in elevation of the chain of FIG. 3;

FIG. 5 is a bottom plan view of the chain of FIG. 3;

FIG. 6 is a cross-sectional view taken substantially along the plane indicated by line 6—6 of FIG. 4; and FIG. 7 is a perspective view of a cutting link of the chain portion of FIG. 3.

The primary purpose of this invention is to reach and saw through tree branches which are too high for conventional sawing methods, i.e., pole saws, power and hand saws used in conjunction with ladders or with tree climbing.

The main body of the cutting assembly is preferably constructed from a flexible chain 1. The chain 1 includes alternate sets of individual and double links 11, 12. The individual links 11 have an end pivotally connected by a pin or rivet 13 between preceding and succeding double link sets 12. Every other double link set 12 includes an outer link 14 having a downwardly projecting and an inwardly extending cutting tooth 15. As shown in FIGS. 3 to 5, the cutting edges 16 on successive cutting teeth 15 on either side of the center line 17 of chain 1 face in the same direction but extend inwardly towards the longitudinal axis of the chain from opposite sides thereof. Successive pairs of cutting teeth on opposite sides of center line 17 face in the opposite direction wherein each tooth 15 facing in one direction will cut when the cutting area is drawn in that one direction, while the teeth 15 facing in the other direction will be cleared of debris, and when the cutting action is reversed, vice-a-versa. The length of the chain also can vary but about 3 feet seems best for most cutting jobs.

One end of the chain 1 has a flat link 2 fixed thereto in a plane substantially perpendicular to the plane of links 11, 12, while a counterweight 18 formed of a flat metal plate is connected to the other end of chain 1 in a plane substantially parallel to links 11, 12 and extends downwardly past the bottom of chain 1. Control ropes 3 of polypropylene, hemp, nylon, or other suitable material are attached in any suitable manner such as with similar looped ends crimped by elements 4 to flat link 2 and counterweight 18. The looped ends are inserted through holes in link 2 and counter weight 18 prior to crimping.

These ropes 3 serve as flexible handles. The length of the two control ropes also can vary depending on the normal height of the offending tree branches above the ground. At the end of one control rope, a temporary weight 5 of approximately 13 to 16 ounces is attached by means of a snap 6 or other fastener so as to detachably hold the weight hereto. The weight may be a bag of sand or lead pellets, solid block of metal or lead or other relatively heavy substance.

Method of Use: Once the branch 9 on tree 10 has been selected to be cut, the weight 5 at one end of the control rope 3 is cast up and over the branch. With one control rope 3 in either hand the saw blade chain portion 1 is then pulled up and onto the branch. The counterweight 18 automatically turns, positions, and orients the cutting side or bottom of the chain 1 in a downward facing, cutting position as the chain is pulled up onto and over branch 9. Once the saw blade chain 1 is positioned, the weight 5 may be removed. By pulling alternately on both control ropes 3, the blade saw chain 1 is pulled back and forth over the branch 9. With each pass, the cutting teeth take their bite until the branch 9 has been sawed through.

What is claimed is:

1. A flexible saw for sawing high branches from trees comprising:
    a flexible cutting area, and
    flexible holding means on each end of the flexible cutting area for oscillating the cutting area against a branch of a tree to be cut,
    said cutting area including:
    a flexible base member comprising a chain made from a plurality of links pivotably connected to each other and a series of spaced apart cutting teeth secured thereto, at least some of said spaced apart cutting teeth facing in one direction along the flexible member and some of said cutting teeth being interspersed between said teeth facing in said one direction and facing in the other direction along the flexible base member, whereby each tooth facing in said one direction will cut when the cutting area is drawn in said one direction, and the teeth facing in the other direction will be cleared of debris, and when cutting action is reversed, vice-a-versa,
    said cutting teeth extending along one edge of said flexible base member, and
    means connected to said flexible base member for orienting said member so that said one edge is in contact with the tree branch to be cut,
    said orienting means including a counterweight on one end of said flexible base member.

2. The flexible saw in accordance with claim 1 wherein said cutting teeth are on selected ones of said links and extend downwardly and inwardly relative to the longitudinal axis of said chain.

3. The flexible saw in accordance with claim 2 wherein successive cutting teeth on said chain extend downwardly and inwardly relative to the longitudinal axis of said chain from opposite sides of said longitudinal axis.

4. The flexible saw in accordance with claim 3 wherein successive pairs of said cutting teeth face in opposite directions along said chain.

5. The flexible saw in accordance with claim 1 including a weight detachably secured to an end of one of said holding means.

6. The flexible saw in accordance with claim 1 wherein said holding means is longer than the flexible base member.

7. The flexible saw in accordance with claim 1 wherein said counterweight is a flat metal plate extending downwardly from said one edge of said flexible base member.

* * * * *